(12) United States Patent
Ghuge et al.

(10) Patent No.: US 11,521,025 B2
(45) Date of Patent: Dec. 6, 2022

(54) SELECTIVE IMAGE COMPRESSION OF AN IMAGE STORED ON A DEVICE BASED ON USER PREFERENCES

(71) Applicant: International Business Machines Corporation, Armonk, NY (US)

(72) Inventors: Deepak Ghuge, Sangamner (IN); Abhishek Jain, Baraut (IN); Subhojit Roy, Pune (IN); Sasikanth Eda, Vijayawada (IN); Manojkiran Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 17/129,485

(22) Filed: Dec. 21, 2020

(65) Prior Publication Data
US 2021/0110214 A1    Apr. 15, 2021

Related U.S. Application Data

(62) Division of application No. 16/218,217, filed on Dec. 12, 2018, now Pat. No. 11,170,269.

(51) Int. Cl.
*G06K 9/62* (2022.01)
*G06N 3/08* (2006.01)
(Continued)

(52) U.S. Cl.
CPC ....... *G06K 9/6267* (2013.01); *G06F 9/30003* (2013.01); *G06N 3/08* (2013.01); *G06V 10/40* (2022.01)

(58) Field of Classification Search
CPC .... G06K 9/6267; G06K 9/46; G06K 9/30003; G06N 3/08
See application file for complete search history.

(56) References Cited

U.S. PATENT DOCUMENTS

2015/0146026 A1   5/2015  Walker et al.
2016/0239946 A1*  8/2016  Naruse ............... H04N 5/23245
(Continued)

FOREIGN PATENT DOCUMENTS

IN    1159KOL2008 A    3/2017

OTHER PUBLICATIONS

Corrected Notice of Allowance from U.S. Appl. No. 16/218,217, dated Aug. 9, 2021.
(Continued)

*Primary Examiner* — Ruiping Li
(74) *Attorney, Agent, or Firm* — Zilka-Kotab, P.C.

(57) ABSTRACT

A computer-implemented method according to one embodiment includes analyzing an image stored on a device. In response to determining that a storage consumption of the device is greater than a first predetermined threshold, content of the image that is both non-focused and that is not of interest is selectively compressed. In response to determining that the storage consumption subsequent to selectively compressing content of the image that is both non-focused and that is not of interest, is greater than a second predetermined threshold, content of the image that is both focused and that is not of interest is selectively compressed. In response to determining that the storage consumption subsequent to selectively compressing content of the image that is both focused and that is not of interest, is greater than the second predetermined threshold, content of the image that is both focused and that is of interest is selectively compressed.

20 Claims, 5 Drawing Sheets

(51) Int. Cl.
    *G06F 9/30*     (2018.01)
    *G06V 10/40*     (2022.01)

(56) References Cited

U.S. PATENT DOCUMENTS

| | | |
|---|---|---|
| 2017/0332077 A1 | 11/2017 | Choi et al. |
| 2018/0018754 A1 | 1/2018 | Leng et al. |
| 2018/0025218 A1 | 1/2018 | Steinberg et al. |
| 2020/0193238 A1 | 6/2020 | Ghuge et al. |

OTHER PUBLICATIONS

Final Office Action from U.S. Appl. No. 16/218,217, dated Oct. 16, 2020.

Final Office Action from U.S. Appl. No. 16/218,217, dated Dec. 8, 2020.

Bm, List of IBM Patents Or Patent Applications Treated As Related, Jan. 2021, 2 pages.

Sajjadi et al., "EnhanceNet: Single Image Super-Resolution Through Automated Texture Synthesis," arXiv preprint, 2017, pp. 1-19, retrieved from https://arxiv.org/abs/1612.07919.

Ghuge et al., U.S. Appl. No. 16/218,217, filed Dec. 12, 2018.

Restriction Requirement from U.S. Appl. No. 16/218,217, dated May 11, 2020.

Non-Final Office Action from U.S. Appl. No. 16/218,217, dated Jun. 30, 2020.

Non-Final Office Action from U.S. Appl. No. 16/218,217, dated Apr. 21, 2021.

Advisory Action from U.S. Appl. No. 16/218,217, dated Feb. 10, 2021.

Notice of Allowance from U.S. Appl. No. 16/218,217, dated Jul. 30, 2021.

\* cited by examiner

SELECTIVE IMAGE COMPRESSION OF AN IMAGE STORED ON A DEVICE BASED ON USER PREFERENCES

BACKGROUND

The present invention relates to storage of images, and more specifically, this invention relates to selective image compression based on user preferences for preserving and/or freeing storage space on a device.

Compression is sometimes utilized for preserving storage space on a device. Compression can be performed on many different types of data, e.g., pictures, video, metadata, audio files, etc. Moreover, there are numerous ways in which conventional compression is performed. For example, when compressing an image, lossless image compression at an elevated level relates to the size of an image being reduced without any quality of the image being lost. In information technology (IT), lossy compression or irreversible compression are classes of data encoding methods that use inexact approximations and partial data discarding to represent content for reducing data size for storage, handling, and transmitting content.

Selective pixel compression is a hybrid approach of compression which incorporates both lossy and lossless compression. Using selective pixel compression, various parts of an image are compressed using either lossy or lossless compression, depending on the amount of information held in that part of the image. Bitplane slicing compression is a technique in which certain bits of a pixel, such as the least significant bits (LSB), are removed from the entire pixel depth to attain an acceptable amount of lossy compression. Moreover, EnhanceNEt-Pat is an algorithm that is presented millions of low-resolution images that the algorithm is to scale up. The algorithm attempts the task of scaling up the images and then is presented for comparison each of the high-resolution original photos. The algorithm perceives the difference between the two and is able to learn from any mistakes the algorithm may have made. In effect, the algorithm improves by being able to find missing information from the picture.

SUMMARY

A computer-implemented method according to one embodiment includes analyzing an image stored on a device to identify predefined differentiating content, contours, and boundaries therein. Focused and non-focused content is identified within the image. Restoration quality rates of the contents of the image are also identified in addition to identifying which of the content of the image is of interest. In response to a determination that a storage consumption of the device is greater than a first predetermined threshold, content of the image that is both non-focused and that is not of interest is selectively compressed. In response to a determination that the storage consumption of the device subsequent to selectively compressing content of the image that is both non-focused and that is not of interest, is greater than a second predetermined threshold, content of the image that is both focused and that is not of interest is selectively compressed. In response to a determination that the storage consumption of the device subsequent to selectively compressing content of the image that is both focused and that is not of interest, is greater than the second predetermined threshold, content of the image that is both focused and that is of interest is selectively compressed.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
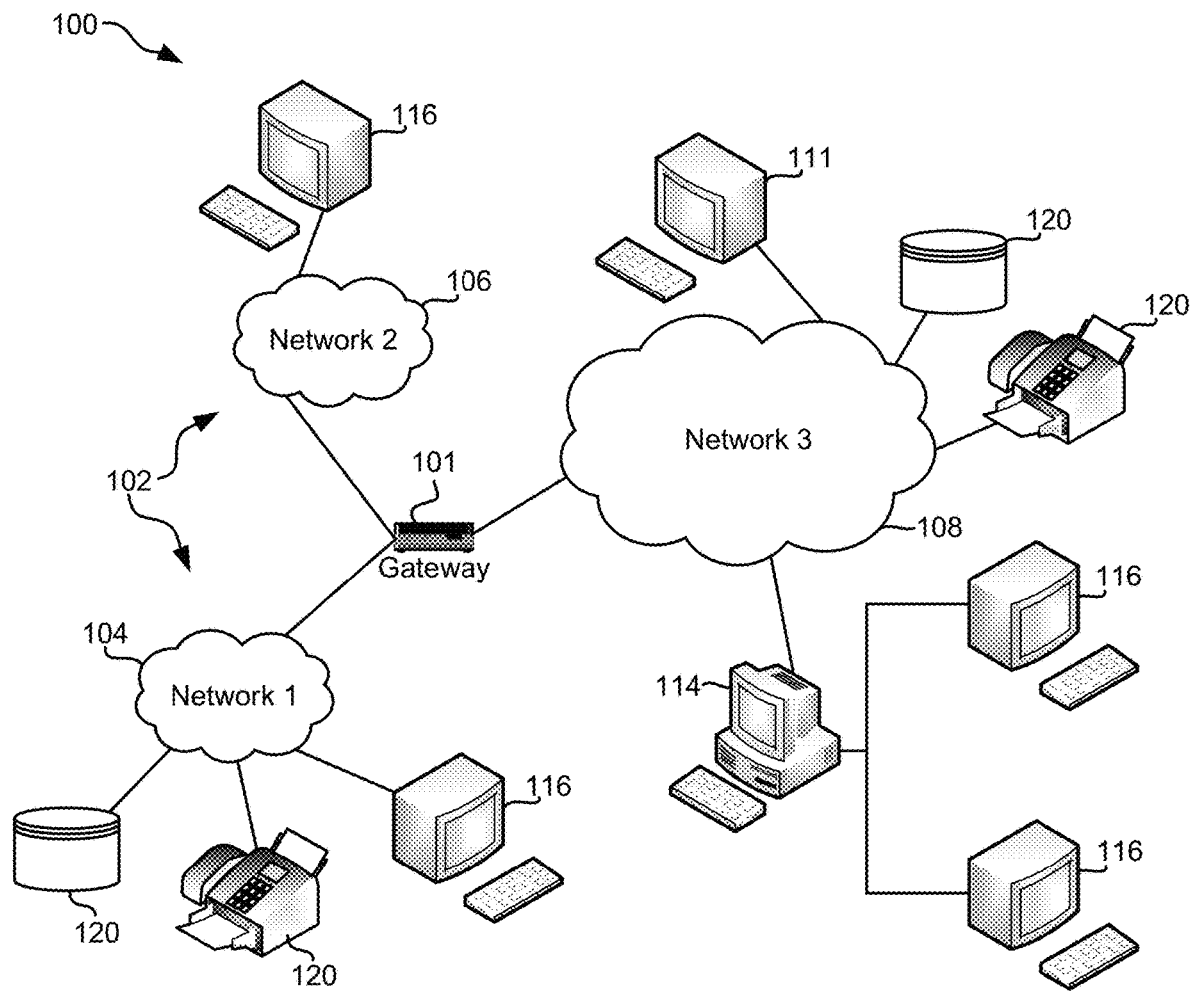
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for selective image compression based on user preferences for preserving and/or freeing storage space on a device. The user preferences can be determined based on user behavior and interactions, in some embodiments.

In one general embodiment, a computer-implemented method includes classifying an image stored on a device as a type of image. A user's access pattern of other images also classified as the type of image is analyzed. The method further includes analyzing at least one sharing medium that the user has previously used to share the image and/or other images. The analyzing the at least one medium is at least in part based on the classified type of the image. The method further includes analyzing a previously recorded delete pattern of the user. The analyzing the previously recorded delete pattern of the user is at least in part based on the classified type of the image. Based on the classified type of the image and/or based on results of the analyses, the image is categorized to one of a plurality of image compression categories. Each category corresponds to a degree of image compression.

In another general embodiment, a computer-implemented method includes analyzing an image stored on a device for predefined differentiating content, contours, and boundaries therein. Focused and non-focused content are identified within the image. The method further includes identifying a restoration quality rate for each of the content of the image, and identifying which of the content of the image is of interest based on a predefined user criterion. In response to determining that a storage consumption of the device is greater than a first predetermined threshold, content of the image that is both non-focused and that is not of interest is selectively compressed. In response to determining that a storage consumption of the device subsequent selectively compressing content of the image that is both non-focused and that is not of interest, is greater than a second predetermined threshold, content of the image that is both focused and that is not of interest is selectively compressed. In response to determining that a storage consumption of the device subsequent selectively compressing content of the image that is both focused and that is not of interest, is greater than the second predetermined threshold, content of the image that is both focused and that is of interest is selectively compressed.

In another general embodiment, a computer program product for selective pixel compression of an image stored on a device based on predefined criteria includes a computer readable storage medium having program instructions embodied therewith. The program instructions are readable and/or executable by a computer to cause the computer to classify, by the computer, an image stored on a device to a type of image. The program instructions are also readable and/or executable by a computer to cause the computer to analyze, by the computer, a user's access pattern of other images also classified as the type of image, and analyze, by the computer, at least one sharing medium that the user has previously used to share the image and/or other images. The analyzing the at least one medium is at least in part based on the classified type of the image. A previously recorded delete pattern of the user is analyzed by the computer. The analyzing the previously recorded delete pattern of the user is at least in part based on the classified type of the image. Based on the classified type of the image and/or based on results of the analyses, the image is categorized, by the computer, to one of a plurality of image compression categories, each category corresponding to a degree of image compression.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
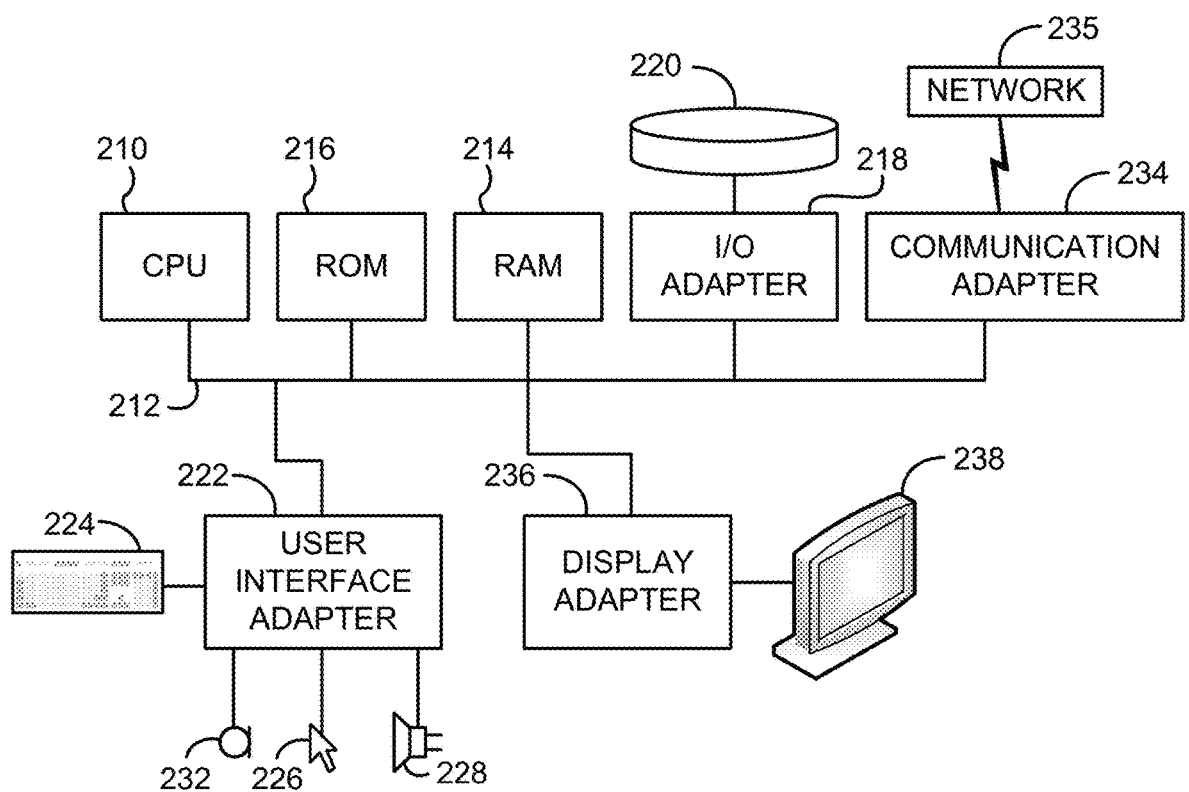
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

As mentioned above, compression is sometimes utilized on devices for preserving storage space on a device, e.g., by compressing pictures, video, metadata, audio files, etc. As digital cameras and smartphones become more sophisticated, yet simpler to use, cameras/pictures are utilized for capturing life events and other subjects more frequently than ever before. However, cameras embedded in conventional mobile phones are very powerful and can capture photographs with relatively high resolution, and thus there is an increasing demand for storage in portable devices. For a variety of reasons, however, the amount of storage available in such mobile devices is limited, e.g. for example limited to 16 Gigabytes (GB), 32 GB, 64 GB, 128 GB, etc. Of course some additional physical memory, e.g., memory cards, may be added to such devices; however, this additional amount of memory added to the device is also limited by the physical size constraints of the device. Accordingly, often times, users consume a maximum storage capacity of such devices.

One conventional technique that is performed in an attempt to preserve storage space on some devices includes using cloud application program interfaces (API's) to transfer content of an image from a mobile device to cloud storage, while metadata (such as a thumbnail) remains on the mobile device. However, this technique includes numerous disadvantages, e.g., internet/network dependency, exponential increases in cost of cloud usage (based on data growth), reduced privacy, potentially compromised security of a user's transferred data, etc. Another conventional technique that is performed in an attempt to preserve storage space on some devices includes the compression of a whole image, where such compression includes storing the compressed image with losses of information. Disadvantages of this technique include, e.g., quality loss, reproduction issues, an increased chance of corruption occurring, power/CPU wastage, etc. Yet another conventional technique that is performed in an attempt to preserve storage space on some devices includes use of external/extended memory cards/devices. However, similar to the two conventional techniques described above, this technique also includes disadvantages, e.g., battery power loss, the additional operation(s) of removal/insertion of a mobile lid, chances of losing the memory cards/devices, etc.

Accordingly, none of the above-mentioned conventional approaches effectively address the issue of increasing an amount of image/photo content stored on a device while maintaining an ability to store such content locally on the device. Nor have any conventional techniques provided a framework for enhancing a user's visual media experience by performing selective pixel compression of an image without compromising the quality of an entity of interest and optimizing storage suited for portable devices.

In sharp contrast, various embodiments described herein utilize selective pixel compression of an image stored on a device based on predefined criteria derived from user interaction with images. The selective pixel compression on images of a device reduces the amount storage capacity used to store the images on the device.

Figure 3:
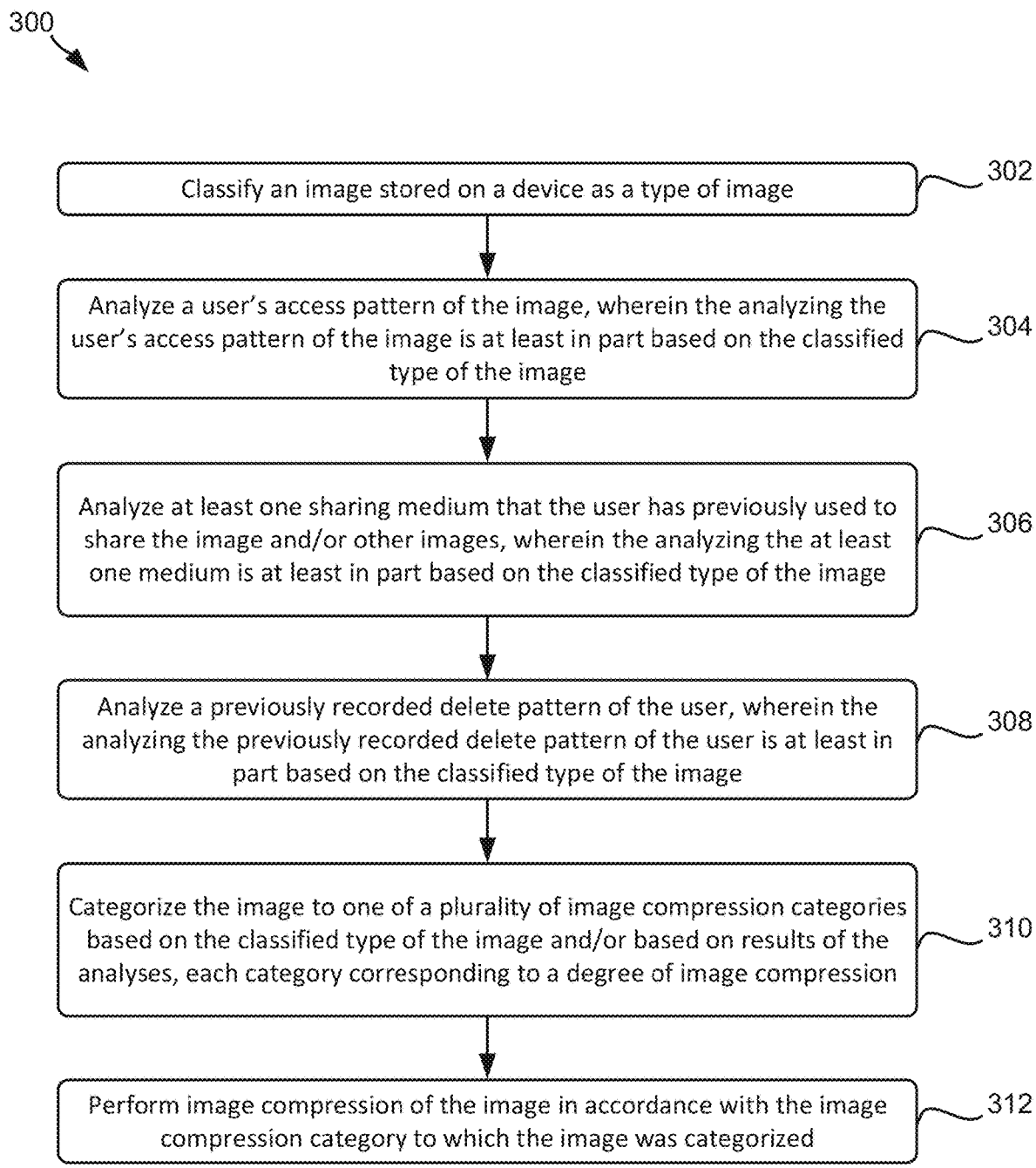
FIG. 3 is a flowchart of a method, in accordance with one embodiment.

Now referring to FIG. 3, a flowchart of a method 300 is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

In some approaches, method 300 may be performed in response to an image being taken and/or stored on a device. In other approaches, method 300 may be additionally and/or alternatively performed after the image has been stored, e.g., on the device and/or any other location, for at least some time.

Operation 302 of method 300 includes classifying the image stored on the device as a type of image. Known classification techniques may be used for such classifying. In some approaches, the image may be classified using supervised or unsupervised machine learning techniques and a corresponding predefined feature set.

The device may be any type of device. For example, in some approaches, the device may be a device that is capable of capturing an image using a camera. Preferably, the device allows a user to perform actions with regards to the image, such as posting the image on social media; sending the image via text, email, etc.; delete the image; etc. Exemplary devices include mobile phones, tablets, laptop and desktop computers, etc. In another approach, the device may not be capable of capturing an image, and instead the device may receive the image, and subsequently store the image thereon.

Depending on the approach, the image stored on the device may be classified to be any type of image, e.g., classified to one or more predefined categories. Such predefined categories may be stored, e.g., in a list, in a table, in a known collection type, etc., locally on the device and/or at a storage location that is known by the device. In some approaches, the type of image may be classified to be a nature or a human type of image. In another approach, the type of image may be classified to be a generic type of image, e.g., that includes an object, a neutral subject, a single color shade, etc. In yet another approach, the type of image may be classified to be a special type of image, e.g., a most commonly accessed type of image, an image that includes a predetermined specific person, an image that includes a predetermined object, etc.

An analysis may be performed on the image, e.g., for determining an amount of image compression that may be performed on the image in order to preserve and/or free storage space on the device. As will now be described by operations 304-310 of method 300, the amount of image compression that may be performed on the image may be based on any one or more variables. In some approaches, known analyzing techniques may be utilized in one or more of such operations. It should be prefaced, however, that any analyzing and/or recordation of access history and/or accessing performed in method 300 are performed with the user's permission.

Operation 304 of method 300 includes analyzing a user's access pattern of other images also classified as the type of image. In preferred approaches the access pattern of the other images also classified as the type of image is stored on the device and/or stored at a location known by the device. However, in some other approaches, an auditing of the user's access pattern of other images also classified as the type of image may be performed to generate the user's access pattern for the analyzing.

Analyzing the user's access pattern of other images also classified as the type of image may consider any one or more types of the other images' access history. For example, the analysis may consider, e.g., a number of times the images have been viewed on the device, a total time that the user has expended editing any of the images, a number of times that the images have been output from the device (such as a total number of times that the other images also classified as the type of image have been uploaded to an online location), etc. Frequent access of a particular type of image may weigh toward less compression to maintain quality. Images of a type that are seldom accessed may be better candidate for more compression.

Operation 306 of method 300 includes analyzing at least one sharing medium that the user has previously used to share the image and/or other images. According to various approaches, numerous non-limiting examples of such mediums may include, e.g., social media platforms, text and/or multimedia communication applications loaded on the device, collaborative picture sharing applications loaded on the device, etc.

In some approaches, analyzing the at least one sharing medium may be at least in part based on the classified type of the image. Images of a specific type that are shared more frequently than others may indicate an affinity for such image, and therefore weigh against more compression to maintain the quality of the images of this type for sharing. In contrast, image types that are seldom shared may be better candidates for more compression.

For example, according to one approach, one or more mediums that are accessed for analyzing at least one sharing medium that the user has previously used to share the image and/or other images may be based on the classified type of the image. In one contextual example, assume that the classified type of the image is a nature type of image. Accordingly, in response to the image being classified as a nature type of image, a user's profile of an online collaborative nature discussion/sharing forum may be analyzed.

Analyzing at least one sharing medium that the user has previously used to share the image and/or other images may provide an expectation of an amount of quality that may be compromised in subsequently performed compression of the image. For example, in response to determining that a user has shared the image or other images also classified as the type of image, on more than a predetermined number of mediums, the analyzing may include determining that the image is important to the user. Based on such a determination, an amount of quality that may be compromised in subsequently performed compression of the image may be minimized if possible. In another example, in response to determining that the image is stored on an online medium that is accessible by the device, the analysis may include determining that a relatively greater amount of quality of the image stored on the device may be compromised during compression, provided that the image could be later restored by accessing an online copy of the image (if necessary).

Method 300 additionally and/or alternatively includes analyzing a previously recorded delete pattern of the user, e.g., see operation 308. Analyzing the previously recorded delete pattern of the user is, in some approaches, at least in part based on the classified type of the image. For example, in one approach, the analysis may include determining a type of image has previously been deleted more than other types of images on the device. As will be described in greater detail elsewhere herein, in such an approach, the analysis may indicate a most commonly deleted type of image and/or types of images that are more commonly deleted than others. In some approaches, this type of image may be first accessed for compression (at least some extent) in order to preserve and/or free storage space on the device.

Based on the classified type of the image and/or based on results of the analyses, the image is categorized to one of a plurality of image compression categories, e.g., see operation 310 of method 300. In a preferred approach, each image compression category corresponds to a degree of image compression that may be performed on the image.

Depending on the approach, the plurality of image compression categories may include any number and/or type of image compression categories. For example, some approaches described elsewhere below include descriptions for three image compression categories, e.g., low, medium and high. Image compression may be performed on the image in accordance with the image compression category to which the image was categorized, e.g., see operation 312 of method 300. In some approaches, such image compression includes using a known type of image compression.

In one approach, the low image compression category indicates that, based on the classified type of the image and/or results of the analyses of method 300, e.g., see operations 304-308, an image is not to be compressed at all, or perhaps only slightly. In other words, in response to the image being categorized to a low image compression category, the degree of image compression of the image may be no image compression. In one approach, "no image compression" may refer to no image compression being performed on the image whatsoever, e.g., the raw image remains despite such an image likely consuming a relatively large amount of storage space of the device. In another approach, "no image compression" may refer to no additional image compression being performed on the image other than standard amounts and/or types of image compression that are typically performed on images after such images are captured and/or saved to the device. For example, in one approach, a standard amount of image compression that is typically performed on an image stored on a device after the image is captured and/or saved to the device may include relatively minor amounts of compression performed in converting the image from an original format to, e.g., a Joint Photographic Experts Group (JPEG) format, a Portable Network Graphics (PNG) format, etc.

Referring now to an opposite extent of the image compression category, the high image compression category indicates that, based on the classified type of the image and/or results of the analyses of method 300, e.g., see operations 304-308, an image is to be compressed and/or is to be first recruited for compressing for preserving and/or freeing storage space on the device. In one approach, in response to the image being categorized to a high image compression category, the degree of image compression performed on the image is full image compression. In another approach, "full image compression" may refer the image being compressed to a maximum amount possible. In another approach, "full image compression" may refer the image being compressed to a maximum predefined extent of image compression. The compression of the image may include any known type of image compression including lossy compression; however, in preferred approaches, compression performed on the image is preferably lossless image compression.

The medium image compression category in some approaches indicates that, based on the classified type of the image and/or results of the analysis based operations of method 300, e.g., see operations 304-308, an image is sometimes recruited for compression and/or is at least partially compressed for preserving and/or freeing storage space on the device. Any degree of image compression and/or type of image compression may be performed on the image in such an approach. For example, according to a more specific approach, in response to the image being categorized to the medium image compression category, the compression applied the image is selectively selected based on additional criteria.

Selective image compression may include performing compression on one or more portions of the image, rather than compressing the entire image. Selective image compression may also include performing different levels of compression on different portions of the image. For example, less or no compression may be applied to content of interest in the image such as people, while more compression may be applied to content of lesser interest in the image, such as the sky in the background.

A preferred approach for performing selective image compression includes performing one or more operations of method 400, which will now be described below, e.g., see method 400. It should be noted that the methods 300-400 do not depend from one another, and may be individually utilized for performing image compression of an image. However, as will become apparent to one of ordinary skill in the art upon reading the descriptions herein, in some approaches, such methods may utilize at least one or more operations and/or decisions of another, e.g., such as method 300 utilizing method 400 for performing selective image compression of an image that has been categorized to the medium image compression category.

Figure 4:
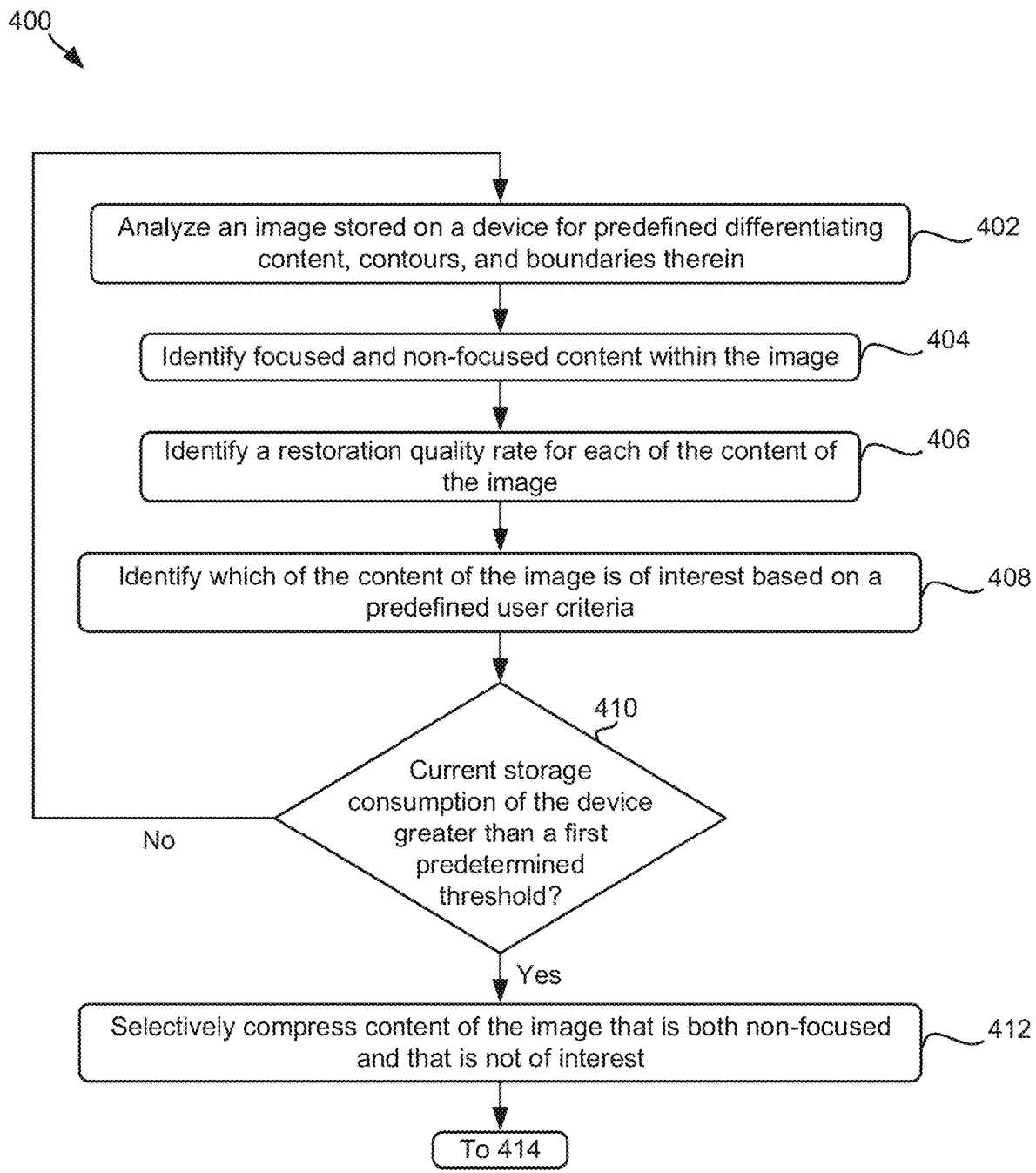
FIG. 4 is a flowchart of a method, in accordance with one embodiment.
Figure 4:
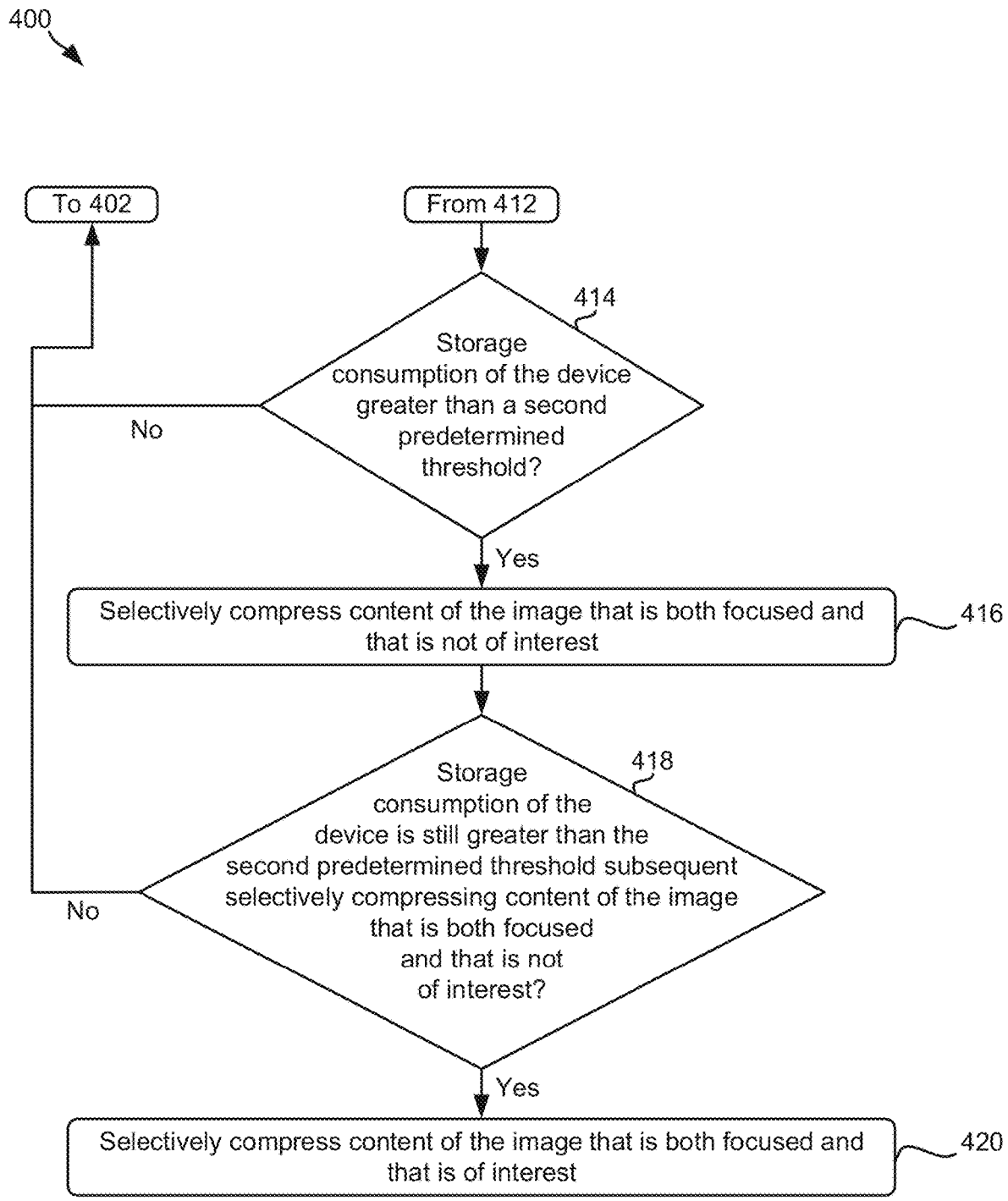

Now referring to FIG. 4, a flowchart of a method 400 is shown according to one embodiment. The method 400 may be performed in accordance with the present invention in any of the environments depicted in FIGS. 1-2, among others, in various embodiments. Of course, more or less operations than those specifically described in FIG. 4 may be included in method 400, as will be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

In some approaches, method 400 may be performed in response to the image being taken and stored. In another approach, method 400 may be performed in response to the image being categorized to a medium image compression category, e.g., see method 300. In yet another approach, method 400 may additionally and/or alternatively be performed after the image has been stored for at least some predetermined amount of time. Accordingly, method 400 enables off-line as well as real time image analytics on images for preserving and/or freeing storage space on the device.

Operation 402 of method 400 includes analyzing an image stored on a device for predefined differentiating content, e.g., people, objects, background, foreground, etc., contours, and boundaries therein. The analyzing may include utilizing any one or more known image analysis techniques. For example, in one approach, analyzing the image for differentiating content, contours and boundaries therein includes applying Bayesian segmentation and analysis. In another approach, analyzing the image for differentiating content, contours and boundaries therein may additionally and/or alternatively include applying image segmentation and analysis. According to yet another approach, analyzing the image for differentiating content, contours and boundaries therein may additionally and/or alternatively include applying known boundary tracing algorithms.

In some approaches, the analysis of operation 402 includes at least temporarily analyzing any of the predefined differentiating content, contours, and/or boundaries of the image in a matrix format, e.g., with respect to relative matrix locations within the image. Moreover, each of the predefined differentiating content, contours, and/or boundaries of the image may be named and/or numbered, e.g., see object-1, object-2, object-3, etc. of the example below which includes computer pseudocode for two different images, i.e., Image-1 and Image-2, that have been analyzed to include numerous predefined differentiating contents, e.g., sky, dog, child, etc., contours, and boundaries (where each boundary is recorded with respect to a relative matrix location of the image).

Image-1=[{'object-1': 'sky'; 'boundaries': [matrix-1]}, {'object-2': 'dog'; 'boundaries': [matrix-2]}, {'object-3': 'child'; 'boundaries': [matrix-3]}, {'object-4': 'bicycle'; 'boundaries': [matrix-4]}}

Image-2=[{'object-1': 'person-1'; 'boundaries': [matrix-1]}, {'object-2': 'trophy'; 'boundaries': [matrix-2]}}

In some approaches, operation 402 of method 400 additionally and/or alternatively includes classifying the image to a type of image, e.g., similar to operation 302 of method 300.

With continued reference to method 400, focused and non-focused content within the image is identified, e.g., see operation 404. In one or more preferred approaches, identifying focused and non-focused content within the image is at least in part based on at least one factor, e.g., size, sharpness, color, relative position, contrast, etc., of at least some of the content of the image with respect to at least some other content of the image. For example, per the example below which continues to consider Image-1 of the example elsewhere above, the differentiated content "child" and "dog" are determined to be relatively more focused content of the image than the differentiated content "sky" and "bicycle." Moreover, per the example below which continues to consider Image-2 of the example elsewhere above, the differentiated content "person-1" and "trophy" are determined to be focused, yet not more relatively focused than other content of Image-2, e.g., as noted by "None".

Image-1=['focus': ['child', 'dog']; 'non-focus': [sky, bicycle]},

Image-2=['focus': ['person-1', 'trophy']; 'non-focus': None}

A restoration quality rate for each of the content of the image may be identified, e.g., see operation 406 of method 400. According to some approaches, identification of the restoration quality rate for each of the content of the image may be based on known machine learning techniques. In some of such approaches, the machine learning techniques may consider peer pixels within the image or another image for the identifying and for preserving a quality of the image during restoration (post-compression). For example, in one approach, at least one pixel of a first content of the image may be compared with at least one pixel of a second content of the image for identifying a restoration quality rate of the first content of the image.

In some approaches, the restoration quality rate for each of the content of the image may be scored on a scale, e.g., 0-1, 1-10, 0-100, etc. For example, an example below considers Image-1 and Image-2 of the example elsewhere above, and identifies a respective restoration quality rate for each of the analyzed predefined differentiating content of the images on a scale of 0-100.

Image-1={'object-1': 'sky', 'restore_quality': '65' }, {'object-2': 'dog'; 'restore_quality': '10' }, {'object-3': 'child'; 'restore_quality': '50' }, 1 'object-4': 'bicycle'; 'restore_quality': '80'}]

Image-2=[{'object-1': 'person-1'; 'restore_quality': '10' }, {'object-2': 'trophy'; 'restore_quality': '20' }}

As exemplified in the example above, the restoration quality rate for each of the contents of the image largely depends on the number of contents that the image includes. This is because machine learning techniques utilize at least some of the other contents of the image and/or other images, e.g., consider peer pixels, when restoring compressed content of an image. By considering peer pixels during restoration, information quality specifications of some content that may have been lost during compression may be recovered through a machine learning technique that considers quality specifications of other contents of the image. This concept is depicted in the example above, in which the four contents of Image-1 for the most part (other than object-2) include relatively greater restoration quality rates than the restoration quality rates of the two contents of Image-2. This is because machine learning techniques are able to consider more peer pixels in Image-1 which has four contents, than the amount of peer pixels that the machine learning techniques are able to consider in Image-2 which includes only the two contents. Accordingly, in some approaches, in order to maximize the restoration quality rates for each of the contents of the image, the analysis performed in operation 402 is preferably devoted a majority of available processing resources of the device. In other approaches, in response to determining that a restoration quality rate of at least one content of the image is less than a predetermined threshold, e.g., as set and/or adjusted by a user and/or an administrator of the logic of the device, operation 402 may be performed again on the image, where the subsequently performed analysis may utilize more processing resources than a most previously performed analysis of the image utilized.

Operation 408 of method 400 includes identifying which content of the image is of interest based on predefined user criteria. In some preferred approaches, the content of the image is of interest with respect to a user that is using the device, e.g., currently using the device, most frequently using the device, a user associated with login credentials that have been most recently correctly entered on the device, etc.

Depending on the approach, identifying which content of the image is of interest is at least in part based on at least one factor. In one approach, the at least one factor includes predetermined social media interests, e.g., as determined subjects that the user has "liked" on such social media platforms, as determined by subjects that the user has most frequently searched and/or commented on such social media platforms, as determined by admitted interests of the user (such as in a survey), etc. It should be noted that similar to other approaches and/or embodiments described herein, any determinations of user interests and/or user profiles are preferably only determined and/or recorded with permission of the user.

In another approach, the at least one factor may additionally and/or alternatively include a predetermined specified degree of importance of the content of the image that is of interest. The specified degree of importance of the content of the image that is of interest may be predetermined, e.g., by a user, by a user's prior access history of the image and/or other similar images (such other image(s) that have been classified to the same type of image as the type of image to which the image is classified), by someone other than the user, etc. The predetermined specified degree of importance of the content of the image that is of interest may in some approaches be characterized by an ordered relative priority of each of the content of the image that is of interest, e.g., in a list, in a table, etc. In such approaches, each of the content of the image that is of interest may include a scored degree of importance to the user.

In yet another approach, the at least one factor may additionally and/or alternatively include a determined frequency of a presence of the content of the image that is of interest existing in other images, e.g., where the other images may also be stored on the device and/or stored at a location that is known and/or accessible by the device. In some approaches, the content of the image may be of interest if the content is present greater than a predetermined frequency in other images. In other words, in such approaches, the content of the image may be considered popular/important to the user and therefore the content is identified to be of interest. In other approaches, the content of the image may be of interest if the content is not present greater than a predetermined frequency in other images. In other words, in such approaches, the content of the image may be considered rare to the user and therefore such content is identified to be of interest.

The at least one factor may additionally and/or alternatively include an occasion of the image. In one approach, at least some of the content of the image may be determined to be of interest in response to determining that the content of the image is related to a predetermined important occasion, e.g., a birthday, an anniversary, a holiday, etc. Depending on the approach, such a determination may be based on any one or more variables, e.g., timestamp information of the image, metadata associated with the image, the content of the image, etc.

A scenario may be an additional and/or alternative factor that may be determined to exist in the image. For example, in one approach, based on the results of the analyzing of the image, e.g., see operation 402, a scenario within the image may be determined, e.g., using predetermined correlations between particular content and scenarios. In such an approach, such correlations may be specific to a user of the device or the correlations may be preset on and selectively applied by the device.

In one approach, in response to determining that a determined scenario of the image matches one or more determined scenarios of other images, e.g., other images stored on the device and/or other images that are stored at some other location than the device, the content of the image that is correlated with the determined scenario of the image may be identified as being of interest. For example, in response to some content of an image being identified to be a timer, running shoes, and an aid station, and such content being correlated with a featured race, it may be determined that the image includes a scenario related to a marathon. Assume for purposes of an example that the image has been posted on a running forum website, the content of the image, e.g., the timer, the running shoes, and the aid station, that was correlated with the determined scenario, i.e., the marathon, may be identified as of interest.

As will now be described below, e.g., see decisions and operations 410-420, in order to maintain an adequate amount of storage space on the device (such as determined by at least one predetermined threshold), in some approaches, a storage consumption of the device may be monitored and/or adjusted by compressing contents of the image.

Decision 410 of method 400 includes determining whether a storage consumption of the device, e.g., preferably a current storage consumption, is greater than a first predetermined threshold. The first predetermined threshold is preferably a predefined percentage of the storage consumption of the device that is to not be exceeded. Accordingly, comparing a current storage consumption of the device with at least the first predetermined threshold establishes a storage buffer so that a user of a device will not be functionally prevented from using the device as a result of a maximum storage capacity of the device being met. According to various approaches, the first predetermined threshold may be predetermined by any one or more sources, e.g., a user, a manufacturer of the device, by a determined rate in which images are being captured by and/or stored on the device, etc.

In response to determining that the current storage consumption of the device is not greater than the first predetermined threshold, method 400 includes not performing compression on the image, e.g., see the "No" logical path of decision 410 return to operation 402. In contrast, in response to determining that the current storage consumption of the device is greater than a first predetermined threshold, content of the image that is both non-focused and that is not of interest is selectively compressed, e.g., see operation 412 of method 400. In the current approach, content of the image that is both non-focused and that is not of interest is selectively compressed as opposed to compressing other content of the image that may be more of a central focus to someone viewing the image, e.g., content that is focused and/or content that is of interest.

It should be noted that the selective compression of method 400 may include performing a known type of lossless and/or lossy compression of content, but in preferred approaches includes a known type of lossless compression of content, e.g., where the extent of such lossless compression is identified by the identified restoration quality rate of the content of the image. In other words, selective compression of contents of the image preferably do not include lossy compression of one or more contents of the image if such contents are identified to have a restoration quality rate that would not allow restoring of the contents thereafter. For example, as described elsewhere above, e.g., see operation 406, contents of images that include relatively few contents therein typically are identified to have relatively lower restoration quality rates than other images. Accordingly, in some preferred approaches, only lossless image compression is performed on the contents of images that are determined to include relatively few contents therein. This allows for full restoration of the selectively compressed contents in a subsequent fulfilling of a received read request for the image having relatively few contents therein.

In some approaches, the current storage consumption of the device may be compared with a second predetermined threshold. A storage consumption of the device may be compared with the second predetermined threshold for any one or more reasons, e.g., to free-up a greater amount of space than the amount of space that is freed-up in response to in response to selectively compressing content of the image that is both non-focused and that is not of interest, in response to anticipating and/or determining that a current rate in which images are being taken by and/or stored on the device will result in the storage capacity of the device being met, etc. According to one approach, a determination is made as to whether the current storage consumption of the device is greater than a second predetermined threshold subsequent selectively compressing content of the image that is both non-focused and that is not of interest, e.g., see decision 414.

In response to determining that a storage consumption of the device subsequent selectively compressing content of the image that is both non-focused and that is not of interest, is greater than a second predetermined threshold (as illustrated by the "Yes" logical path leading from decision 414) content of the image that is both focused and that is not of interest is selectively compressed, e.g., see operation 416. It may be noted that selectively compressing content of the image that is both focused and that is not of interest equates to a more aggressive compression of the image than the compression of operation 412. Accordingly, in some approaches, assuming that the current storage consumption of the device is greater than the second predetermined threshold, operation 416 is performed only if operation 412 has already been performed on the image. However, in some other approaches, operation 416 may be performed at any time.

In some approaches, the storage consumption of the device may remain greater than the second predetermined threshold subsequent to selectively compressing content of the image that is both focused and that is not of interest. Accordingly, in one approach, a determination is made as to whether a storage consumption of the device subsequent to selectively compressing content of the image that is both focused and that is not of interest, is greater than the second predetermined threshold, e.g., see decision 418. In one approach, in response to determining that the storage consumption of the device subsequent selectively compressing content of the image that is both focused and that is not of interest, is greater than the second predetermined threshold, content of the image that is both focused and that is of interest is selectively compressed, e.g., see operation 420.

In some approaches, in response to determining that the storage consumption of the device is still greater than the second predetermined threshold subsequent selectively compressing content of the image that is both focused and that is not of interest, method 400 optionally includes outputting a request for user input. This is because selectively compressing content of the image that is both focused and that is not of interest may be a most aggressive extent of compression that is to be performed on the image. In some approaches, the output request for user input may include a suggestion for the user on how to assist in freeing-up storage space on the device, e.g., a suggestion that the user delete at least some data stored on the phone, a suggestion that the user add a selectively removable memory device (such as a memory card) to the device, a suggestion that the user upload at least some data stored on the device to another storage location, etc.

In some approaches, one or more of the compression operations of method 400 may be performed on the content of the image provided that it is determined that such content is capable of being thereafter restored, e.g., using known restoration techniques, to a predetermined threshold of quality. For example, in one approach, selective compression performed on content that is of interest may depend on the result of a determination that the content that is of interest may thereafter be restored to greater than fifty percent of an original quality of the content that is of interest. For context, in the current approach, an "original quality" refers to a quality of the content prior to selective compression being performed.

Compressed contents of the image may, in some approaches, be recorded. For example, according to one approach, in response to selectively compressing content of the image, method 400 optionally may include marking metadata of the image with a flag that indicates that the image has been selectively compressed. Such a flag may serve as a reminder/notification that the image has been compressed and may be restored in response to reviving a read request for the image. For example, at any time, method 400 may include receiving a read request for the image after compression is performed on the image. In such an approach, in response to determining that the metadata of the image is marked with a flag, compressed portions of the image may be restored, e.g., by utilizing machine learning techniques. In a more specific approach, an original quality of each of the content of the image is restored according to the identified restoration quality rate of each of the content. The metadata of the image may be unmarked, e.g., indicating the current state of the image is not compressed and/or has been at least partially restored, subsequent restoring being applied to the content.

Because compressed contents of an image may be restored, storage space on the device is preserved and/or able to be freed-up with minimal losses (if any). Moreover, the more that content and user preferences of the images stored on a device are analyzed, e.g., using one or more of the methods described herein, e.g., method 300-400, the more user friendly such compression becomes. In other words, in some approaches, such compression considers preferences of at least one user, and therefore contents of the image that the user focuses on when viewing the photo will not be lost. This results in a reduction of processing performed by a device that is performing one or more of such methods, as the device will not reach a maximum consumed storage capacity as frequently (if at all). This will also result in less processing being performed by the device, as images that a user is most likely/inclined to use (based on the user's preferences) are preferably least compressed in (if at all) relative to other images that are compressed for freeing-up/ preserving storage space on the device. This will result in less recovery operations being performed overall on the device upon the user most frequently accessing these preferred images.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
analyzing an image stored on a device to identify predefined differentiating content, contours, and boundaries therein;
identifying focused and non-focused content within the image;
identifying restoration quality rates of the contents of the image;
identifying which of the content of the image is of interest;
in response to a determination that a storage consumption of the device is greater than a first predetermined threshold, selectively compressing content of the image that is both non-focused and that is not of interest;
in response to a determination that the storage consumption of the device, subsequent to selectively compressing content of the image that is both non-focused and that is not of interest, is greater than a second predetermined threshold, selectively compressing content of the image that is both focused and that is not of interest; and
in response to a determination that the storage consumption of the device, subsequent to selectively compressing content of the image that is both focused and that is not of interest, is greater than the second predetermined threshold, selectively compressing content of the image that is both focused and that is of interest.

2. The computer-implemented method of claim 1, wherein analyzing the image to identify differentiating content, contours and boundaries therein includes applying at least one technique from the group consisting of: Bayesian segmentation and analysis, image segmentation and analysis, and boundary tracing algorithms.

3. The computer-implemented method of claim 1, wherein identifying focused and non-focused content within the image is at least in part based on at least one factor from the group consisting of: size, sharpness, color, relative position, and contrast of a portion of the content within the image with respect to one or more other portions of content within the image.

4. The computer-implemented method of claim 1, wherein identifying the restoration quality rates of the contents of the image is based on machine learning techniques, wherein the machine learning techniques consider peer pixels within the image or another image.

5. The computer-implemented method of claim 1, wherein identifying which of the content of the image is of interest is at least in part based on at least one factor from the group consisting of: predetermined social media interests, and a predetermined specified degree of importance of the content of the image that is of interest.

6. The computer-implemented method of claim 1, wherein identifying which of the content of the image is of interest includes: determining a frequency at which content of the image exists in other images, wherein the content of the image that is of interest is content of the image that is not present greater than a predetermined frequency in the other images.

7. The computer-implemented method of claim 1, comprising: in response to a determination that the storage consumption of the device is still greater than the second predetermined threshold subsequent to selectively compressing content of the image that is both focused and that is not of interest, outputting a request for user input.

8. The computer-implemented method of claim 7, wherein the request includes a suggested technique for freeing-up storage space on the device.

9. The computer-implemented method of claim 1, comprising: in response to selectively compressing content of the image, marking metadata of the image with a flag that indicates that the image has been selectively compressed.

10. The computer-implemented method of claim 9, comprising:
receiving a request to read the image after selective compression is performed on the image;
restoring selectively compressed contents of the image; and
unmarking the metadata of the image.

11. A computer program product, the computer program product comprising a computer readable storage medium having program instructions embodied therewith, the program instructions readable and/or executable by a computer to cause the computer to:
analyze, by the computer, an image stored on a device to identify predefined differentiating content, contours, and boundaries therein;
identify, by the computer, focused and non-focused content within the image;
identify, by the computer, restoration quality rates of the contents of the image;
identify, by the computer, which of the content of the image is of interest;
in response to a determination that a storage consumption of the device is greater than a first predetermined threshold, selectively compress, by the computer, content of the image that is both non-focused and that is not of interest;
in response to a determination that the storage consumption of the device, subsequent to selectively compressing content of the image that is both non-focused and that is not of interest, is greater than a second predetermined threshold, selectively compress, by the computer, content of the image that is both focused and that is not of interest; and in response a determination that the storage consumption of the device, subsequent to selectively compressing content of the image that is both focused and that is not of interest, is greater than the second predetermined threshold, selectively compress, by the computer, content of the image that is both focused and that is of interest.

12. The computer program product of claim 11, wherein analyzing the image to identify differentiating content, contours and boundaries therein includes applying at least one technique from the group consisting of: Bayesian segmentation and analysis, image segmentation and analysis, and boundary tracing algorithms.

13. The computer program product of claim 11, wherein identifying focused and non-focused content within the image is at least in part based on at least one factor from the group consisting of: size, sharpness, color, relative position, and contrast of a portion of the content within the image with respect to one or more other portions of content within the image.

14. The computer program product of claim 11, wherein identifying the restoration quality rates of the contents of the image is based on machine learning techniques, wherein the machine learning techniques consider peer pixels within the image or another image.

15. The computer program product of claim 11, wherein identifying which of the content of the image is of interest includes: determining a frequency at which content of the image exists in other images, wherein the content of the image that is of interest is content of the image that is not present greater than a predetermined frequency in the other images.

16. The computer program product of claim 11, the program instructions readable and/or executable by the computer to cause the computer to: output, by the computer, a request for user input in response to a determination that the storage consumption of the device is still greater than the second predetermined threshold subsequent to selectively compressing content of the image that is both focused and that is not of interest.

17. The computer program product of claim 16, wherein the request includes a suggested technique for freeing-up storage space on the device.

18. The computer program product of claim 11, the program instructions readable and/or executable by the computer to cause the computer to: mark, by the computer, metadata of the image with a flag that indicates that the image has been selectively compressed in response to selectively compressing content of the image.

19. The computer program product of claim 18, the program instructions readable and/or executable by the computer to cause the computer to:
receive, by the computer, a request to read the image after selective compression is performed on the image;
restore, by the computer, selectively compressed contents of the image; and
unmark, by the computer, the metadata of the image.

20. A system, comprising:
a processor; and
logic integrated with the processor, executable by the processor, or integrated with and executable by the processor, the logic being configured to:
analyze an image stored on a device to identify predefined differentiating content, contours, and boundaries therein;
identify focused and non-focused content within the image;

identify restoration quality rates of the contents of the image;
identify which of the content of the image is of interest;
in response to a determination that a storage consumption of the device is greater than a first predetermined threshold, selectively compress content of the image that is both non-focused and that is not of interest;
in response to a determination that the storage consumption of the device, subsequent to selectively compressing content of the image that is both non-focused and that is not of interest, is greater than a second predetermined threshold, selectively compress content of the image that is both focused and that is not of interest; and
in response to a determination that the storage consumption of the device, subsequent to selectively compressing content of the image that is both focused and that is not of interest, is greater than the second predetermined threshold, selectively compress content of the image that is both focused and that is of interest.

* * * * *